United States Patent
Suzumura et al.

(10) Patent No.: US 8,023,565 B2
(45) Date of Patent: Sep. 20, 2011

(54) PICTURE PROCESSING APPARATUS, SEMICONDUCTOR INTEGRATED CIRCUIT, AND METHOD FOR CONTROLLING A PICTURE MEMORY

(75) Inventors: Tatsuhiro Suzumura, Kanagawa (JP); Akihiro Oue, Kanagawa (JP); Kunihiko Yahagi, Kanagawa (JP); Shuji Michinaka, Kanagawa (JP); Satoshi Takekawa, Kanagawa (JP); Kiwamu Watanabe, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1397 days.

(21) Appl. No.: 11/475,172

(22) Filed: Jun. 27, 2006

(65) Prior Publication Data

US 2006/0291568 A1  Dec. 28, 2006

(30) Foreign Application Priority Data

Jun. 27, 2005  (JP) .................................. 2005-186993

(51) Int. Cl.
*H04N 7/18* (2006.01)
(52) U.S. Cl. ............... 375/240.25; 375/240.26; 348/715; 348/716
(58) Field of Classification Search ......... 375/240.01–240.29; 348/715–721
See application file for complete search history.

(56) References Cited

U.S. PATENT DOCUMENTS 7,557,811 B2 *  7/2009  Linzer et al. .................. 345/531

FOREIGN PATENT DOCUMENTS

| JP | 10-304354 | 11/1998 |
| JP | 11-167518 | 6/1999 |
| JP | 2004-120027 | 4/2004 |

OTHER PUBLICATIONS

U.S. Appl. No. 11/857,874, filed Sep. 19, 2007, Suzumura, et al.

* cited by examiner

*Primary Examiner* — Andy Rao
(74) *Attorney, Agent, or Firm* — Oblon, Spivak, McClelland, Maier & Neustadt, L.L.P.

(57) ABSTRACT

A picture processing apparatus includes a decoder configured to decode encoded data to generate a decoded picture. A picture memory has a plurality of banks each containing a plurality of pages to which row addresses are assigned, and is configured to store the decoded picture. A bank selector is configured to divide the decoded picture into a plurality of blocks, and to select a page of a different bank as a write location for a block adjacent in at least one of either a horizontal direction or a vertical direction. A write controller is configured to write pixel data of pixels occupying even lines of each of the blocks, and pixel data of pixels occupying odd lines of each of the blocks in a column address direction of each of the page in an alternating manner.

9 Claims, 10 Drawing Sheets

FIG. 12

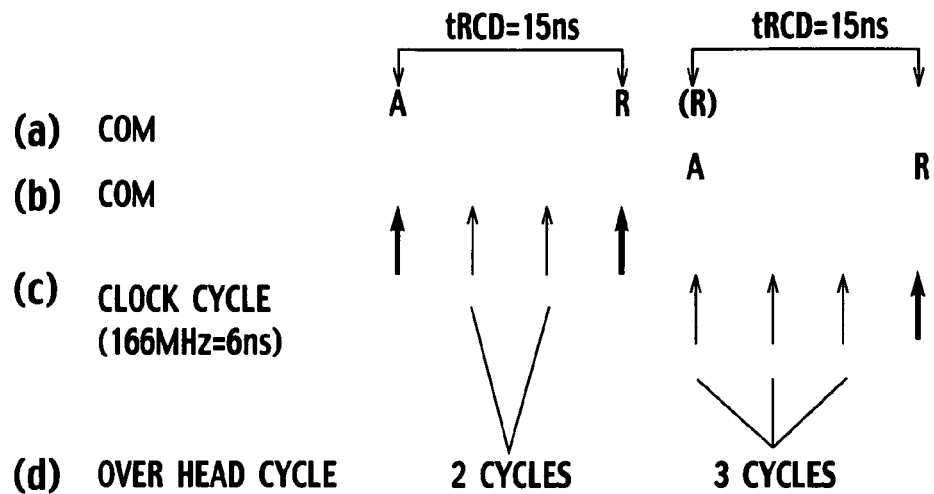

FIG. 13

| LUMINANCE AND CHROMINANCE(EVEN LINE) | | LUMINANCE AND CHROMINANCE(ODD LINE) | | PAGE SWITCH IN THE SAME BANK | TOTAL |
|---|---|---|---|---|---|
| NUMBER OF TRANSFER LINE | TOTAL OVER HEAD CYCLE | NUMBER OF TRANSFER LINE | TOTAL OVER HEAD CYCLE | | |
| 16 | 11 | 12 | 0 | 0 | 39 |

FIG. 14

| LUMINANCE AND CHROMINANCE(EVEN LINE) | | LUMINANCE AND CHROMINANCE(ODD LINE) | | PAGE SWITCH IN THE SAME BANK | TOTAL |
|---|---|---|---|---|---|
| NUMBER OF TRANSFER LINE | TOTAL OVER HEAD CYCLE | NUMBER OF TRANSFER LINE | TOTAL OVER HEAD CYCLE | | |
| 48 | 11 | 48 | 0 | 0 | 107 |

FIG. 17

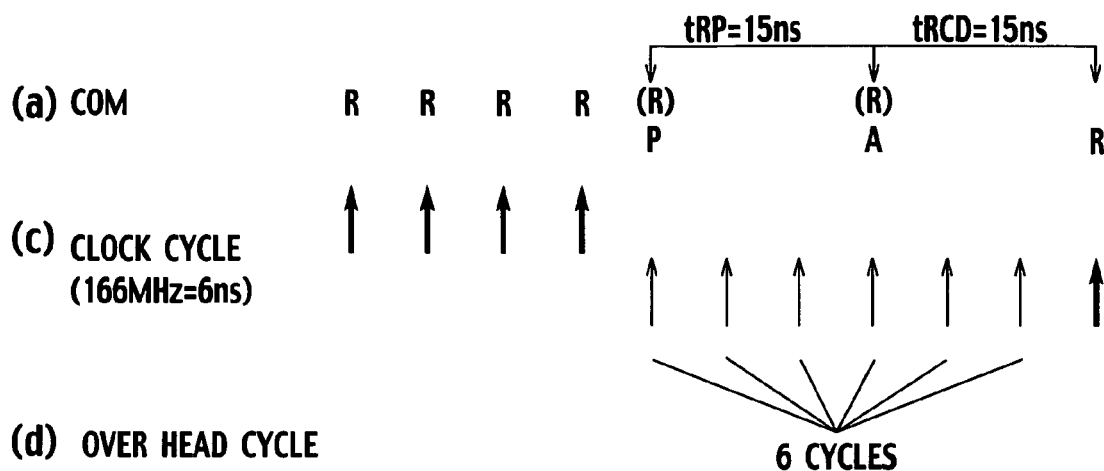

FIG. 18

| LUMINANCE (EVEN LINE) | | LUMINANCE (ODD LINE) | | CHROMINANCE (EVEN LINE) | | CHROMINANCE (ODD LINE) | | PAGE SWITCH IN THE SAME BANK | TOTAL |
|---|---|---|---|---|---|---|---|---|---|
| NUMBER OF TRANSFER LINE | TOTAL OVER HEAD CYCLE | NUMBER OF TRANSFER LINE | TOTAL OVER HEAD CYCLE | NUMBER OF TRANSFER LINE | TOTAL OVER HEAD CYCLE | NUMBER OF TRANSFER LINE | TOTAL OVER HEAD CYCLE | | |
| 10 | 11 | 8 | 11 | 4 | 11 | 2 | 5 | 72 | 134 |

FIG. 19

| LUMINANCE (EVEN LINE) | | LUMINANCE (ODD LINE) | | CHROMINANCE (EVEN LINE) | | CHROMINANCE (ODD LINE) | | PAGE SWITCH IN THE SAME BANK | TOTAL |
|---|---|---|---|---|---|---|---|---|---|
| NUMBER OF TRANSFER LINE | TOTAL OVER HEAD CYCLE | NUMBER OF TRANSFER LINE | TOTAL OVER HEAD CYCLE | NUMBER OF TRANSFER LINE | TOTAL OVER HEAD CYCLE | NUMBER OF TRANSFER LINE | TOTAL OVER HEAD CYCLE | | |
| 22 | 11 | 20 | 11 | 10 | 11 | 8 | 11 | 72 | 176 |

PICTURE PROCESSING APPARATUS, SEMICONDUCTOR INTEGRATED CIRCUIT, AND METHOD FOR CONTROLLING A PICTURE MEMORY

CROSS REFERENCE TO RELATED APPLICATION AND INCORPORATION BY REFERENCE

This application is based upon and claims the benefit of priority from prior Japanese Patent Application P2005-186993 filed on Jun. 27, 2005; the entire contents of which are incorporated by reference herein.

BACKGROUND OF THE INVENTION

1. Field of the Invention

The present invention relates to a picture processing apparatus for decoding encoded picture data, a semiconductor integrated circuit, and a method for controlling a picture memory.

2. Description of the Related Art

A synchronous dynamic random access memory (SDRAM) has a plurality of banks, which are storage regions. Each bank is arranged in a two-dimensional constitution of rows and columns. A data buffer for retaining data corresponding to a row address is provided for each bank. Each storage region corresponding to each row address is called a "page". It is possible to execute high speed access of the data buffer. On the other hand, when pages within the same bank are switched, overhead cycles (cycles other than accessing data) increase. Thus, a technique for reducing the access time according to heavy use of bank switching due to page switching has been proposed.

Concerning video compression encoding technology, during encoding, the difference between the frames is calculated in units of picture blocks for the purpose of reducing the amount of information in the time direction, and the calculated difference is encoded. The picture blocks are obtained by dividing the original picture. During decoding, the difference is decoded, and a part of a picture region that has previously been decoded is added to the decoded difference as a reference picture to attain the original picture. Thus, a picture memory able to store a previously decoded picture is provided in a picture processing apparatus for executing decoding of encoded data. The SDRAM is generally used as the picture memory.

However, in the abovementioned technique of switching banks in correspondence to the address change, it is impossible to realize high speed memory access due to no optimization of the reference picture. For this reason, a memory access technique optimizing the reference picture in the decoding of picture data is desired.

SUMMARY OF THE INVENTION

An aspect of the present invention inheres in a picture processing apparatus encompassing, a decoder configured to decode encoded data to generate a decoded picture, a picture memory having a plurality of banks each containing a plurality of pages to which row addresses are assigned, and configured to store the decoded picture, a bank selector configured to divide the decoded picture into a plurality of blocks, and to select a page of a different bank as a write location for a block adjacent in at least one of either a horizontal direction or a vertical direction, and a write controller configured to write pixel data of pixels occupying even lines of each of the blocks, and pixel data of pixels occupying odd lines of each of the blocks in a column address direction of each of the page in an alternating manner.

Another aspect of the present invention inheres in a semiconductor integrated circuit encompassing, a decoder configured to decode encoded data to generate a decoded picture, a picture memory having a plurality of banks each containing a plurality of pages to which row addresses are assigned, and configured to store the decoded picture, a bank selector configured to divide the decoded picture into a plurality of blocks, and to select a page of a different bank as a write location for a block adjacent in at least one of either a horizontal direction or a vertical direction, and a write controller configured to write pixel data of pixels occupying even lines of each of the blocks, and pixel data of pixels occupying odd lines of each of the blocks in a column address direction of each of the page in an alternating manner.

Still another aspect of the present invention inheres in a method for controlling a picture memory having a plurality of banks each containing a plurality of pages to which row addresses are assigned, the method encompassing, dividing a decoded picture into a plurality of blocks, selecting a page of a different bank as a write location for a block adjacent in at least one of either a horizontal direction or a vertical direction, and writing pixel data of pixels occupying even lines of each of the blocks, and pixel data of pixels occupying odd lines of each of the blocks in a column address direction of each of the page in an alternating manner.

BRIEF DESCRIPTION OF THE DRAWINGS

FIG. 12 is a schematic diagram showing overhead cycle in the read out operation of the read controller according to the embodiment of the present invention.

FIG. 13 is a table showing the overhead cycle and the number of times the row address is changed in the read out operation of the read controller according to the embodiment of the present invention.

FIG. 14 is a table showing the overhead cycle and the number of times the row address is changed in the read out operation of the read controller according to the embodiment of the present invention.

FIG. 17 is a schematic diagram showing the overhead cycle in the read out operation according to the comparative example of the embodiment of the present invention.

FIG. 18 is a table showing the overhead cycle in the read out operation according to the comparative example of the embodiment of the present invention.

FIG. 19 is a table showing the overhead cycle in the readout operation according to the comparative example of the embodiment of the present invention.

DETAILED DESCRIPTION OF THE INVENTION

Figure 1:
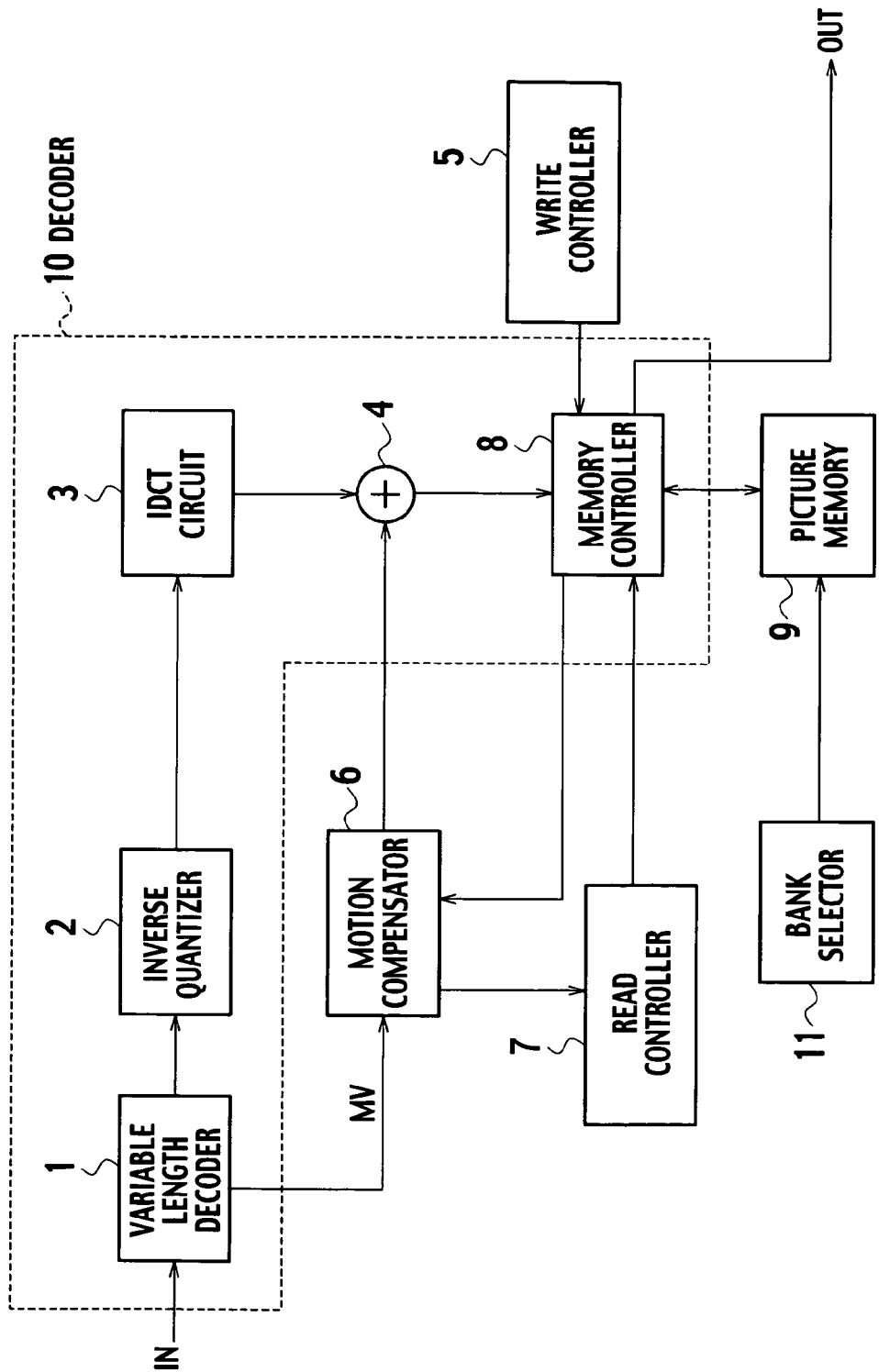
FIG. 1 is a block diagram showing a configuration example of a picture processing apparatus according to an embodiment of the present invention.

Various embodiments of the present invention will be described with reference to the accompanying drawings. It is to be noted that the same or similar reference numerals are applied to the same or similar parts and elements throughout the drawings, and description of the same or similar parts and elements will be omitted or simplified. In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail. In the following description, the words "connect" or "connected" defines a state in which first and second elements are electrically connected to each other without regard to whether or not there is a physical connection between the elements.

Figure 2:
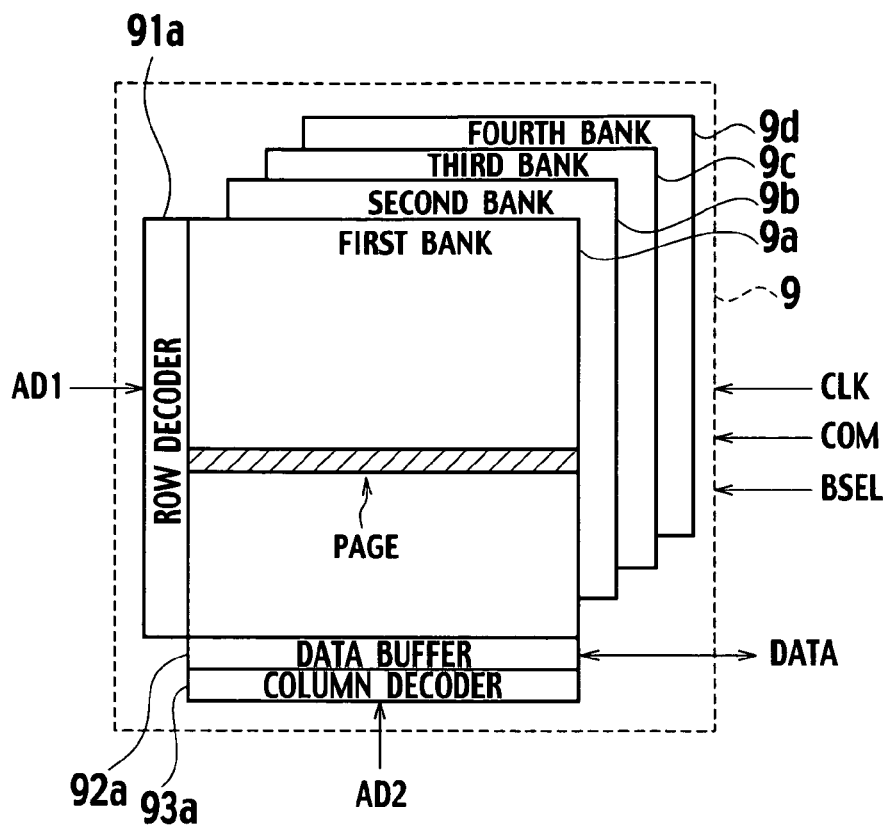
FIG. 2 is a schematic diagram showing an arrangement example of a plurality of banks in a picture memory according to the embodiment of the present invention.

As shown in FIG. 1, a picture processing apparatus according to an embodiment of the present invention includes a decoder 10, a picture memory 9, a bank selector 11, a write controller 5, a motion compensator 6, and a read controller 7. The decoder 10 decodes an encoded data IN to generate a decoded picture OUT. The picture memory 9, as shown in FIG. 2, has a plurality of banks 9a to 9d which each contain a plurality of pages having row addresses distributed, and stores the decoded picture. The bank selector 11 divides the decoded picture into a plurality of blocks, and selects a page of a different bank as a write destination of blocks adjacent in at least one of either the horizontal or the vertical direction. The write controller 5 writes pixel data of pixels existing on an even number line of each block, and pixel data of pixels existing on an odd number line of each block alternately in the column address direction of each page. Here the term "pixel data" refers to a luminance component Y of each pixel, and chrominance components C such as a blue chrominance component Cb and a red chrominance component Cr. According to storing the luminance component Y and the chrominance component C within the same page, by executing burst reading which reads out the data of each page in a bursting fashion it is possible to read both the luminance component Y and the chrominance component C from each page in a single attempt.

Moreover, it is possible to use picture decoding apparatuses in compliance with H.263 or H.264 video communication media encoding standards or storage media encoding standards such as the moving picture experts group (MPEG) standard as the picture processing apparatus according to the embodiment of the present invention. Also, the write controller 5 selectively writes each the luminance and the chrominance components contained in the pixel data in the column address direction of each page of the picture memory 9. The read controller 7 reads the decoded picture from a page of any of the plurality of banks of the picture memory 9, and switches to a page of another bank in a case of switching the read target page. The motion compensator 6 designates a region of a portion of the decoded picture corresponding to the read controller 7 in accordance with the motion vector data MV which the decoder 10 has decoded from the encoded data IN, and outputs the region of the portion of the decoded picture read by the read controller 7 as a reference picture.

The write controller 5 correlates the picture address of the decoded picture with the row and column address, and controls the writing of the pixel data. The read controller 7 correlates the picture address with the row and the column address, and controls the reading of the pixel data.

The decoder 10 further includes, a variable length decoder 1, an inverse quantizer 2, an inverse discrete cosine transform circuit 3, an adder 4, a memory controller 8, and the like. The encoded data IN supplied by an optical disc drive apparatus or the like for example, is input to the variable length decoder 1. The variable length decoder 1 decodes the encoded data with variable length decoding (or arithmetic decoding) and reverts it back to the data of before the variable length encoding of the encoding side. An intra-frame encoded picture (I picture), an inter-frame forward predictive encoded picture (P picture), a bidirectional predictive encoded picture (B picture), and the like, are contained in the encoded data IN, in the case of MPEG for example. In the following description, the P picture and the B picture will be termed as "frame encoded picture".

In this case, the intra-frame encoded picture is used as the reference picture generation standard. Although the intra-frame encoded picture is compressed picture data, it contains the luminance component and the chrominance component for a single frame. The inter-frame encoded picture is used as the difference picture. The inter-frame forward predictive encoded picture is the difference picture comprised of the difference between the current frame and the frame located in the back direction. The bidirectional predictive encoded picture is the difference picture comprised of the difference between the current frame and the frames located in the back direction and the forward direction.

The inverse quantizer 2 inversely quantizes the output data of the variable length decoder 1. The IDCT circuit 3 executes IDCT processes to the output data of the inverse quantizer 2. The output data of the IDCT circuit 3 is supplied to the adder 4. When the encoded data IN is the intra-frame encoded picture, the output data of the IDCT circuit 3 is the original picture before encoding. When the encoded data IN is the inter-frame encoded picture, the output data of the IDCT circuit 3 is a decoded predictive error.

Moreover, the processing of each of the variable length decoder 1, the inverse quantizer 2, and the IDCT circuit 3 are executed in picture block (macro block) units of 16×16 pixels. Thus, the output data of the IDCT circuit 3 is given to the adder 4 in units of the picture block. In standards such as H.264 and the like, it is possible to select picture block sizes of 16×16 pixels, 16×8 pixels, 8×16 pixels, 8×8 pixels.

The motion vector data used during predictive encoding in the encoding side is added to the encoded data IN in multiplicity. The motion vector refers to the vector showing the relative position of the horizontal direction and the vertical direction of the original picture blocks of the original picture and blocks close to the original picture blocks of among the picture that differs from the original picture chronologically.

A data MV of the motion vector output from the variable length decoder 1 is supplied to the motion compensator 6. Based on the motion vector data MV from the variable length decoder 1, the motion compensator 6 calculates the position on the picture at which the picture block of among the decoded picture corresponding to the decoding target picture block is located. The picture address calculated by the motion compensator 6 is supplied to the read controller 7.

Based on the motion vector, the motion compensator 6 clips from the decoded picture stored in the picture memory 9, a picture of a size identical to that of the difference data and located at the same position as the difference data, as the reference picture. By adding the clipped out reference picture and the difference data, and rewriting the picture memory 9, a single complete picture is attained therein the picture memory 9. By carrying out the above operation repeatedly, it is possible to play a chronologically continuous picture.

The read controller 7 generates a read address from the picture address from the motion compensator 6 and supplies it to the memory controller 8. As a result, a portion of the decoded picture is read as the reference picture from the picture memory 9 and supplied to the adder 4 via the motion compensator 6.

When the picture block of the original picture is supplied from the IDCT circuit 3, the adder 4 sends the picture block of the original picture to the picture memory 9 via the memory controller 8. The adder 4, when the difference data is supplied from the IDCT circuit 3, adds the reference picture from the motion compensator 6 to the difference data. As a result, the original picture data is decoded, and the original picture data is stored in the picture memory 9 via the memory controller 8. The original picture data stored in the picture memory 9 is used in the subsequent decoding as the decoded picture. Although the write controller 5 generates the write address of the picture memory 9 and supplies it to the memory controller 8, it is also acceptable to generate the write address based on the output data of the IDCT circuit 3.

when SDRAM such as double data rate (DDR)-SDRAM or the like is used as the picture memory 9, as shown in FIG. 2, further included is a plurality of banks which are memory regions. In the example shown in FIG. 2, the picture memory 9 has first to fourth banks 9a to 9d. Each bank is managed independently. Therefore, preparation for access of the second bank 9b for example is possible during access of the first bank 9a.

A clock CLK, a command COM, row address data AD1, column address data AD2, and the like are supplied to the picture memory 9 from the memory controller 8 shown in FIG. 1. A bank selection signal BSEL is supplied to the picture memory 9 from the bank selector 11. Active commands, write commands, read commands, pre-charge commands, and the like are available for use as the command COM. The bank selection signal BSEL is used to select any of the first to fourth banks 9a to 9d. Note that illustration of a command decoder, a sense amp, and the like have been omitted from the picture memory 9 shown in FIG. 2.

With respect to the first bank 9a, a row decoder 91a, a column decoder 93a, and a data buffer 92a are connected to first bank 9a. The row decoder 91a decodes the row address data AD1, and selects a word line. The column decoder 93a decodes the column address data AD2, and selects a bit line. The data buffer 92a retains a portion of data for a single page of the first bank 9a, and inputs and outputs write/read DATA to the memory controller 8 shown in FIG. 1.

Similarly, row decoders, column decoders, and data buffers (not illustrated) are connected to each of the second to fourth banks 9b to 9d. Because the data buffer 92a can only retain a portion of write/read DATA for a single page, by supplying only the first address of the continuous column addresses, it is possible to synchronize a specified number of subsequent addresses to the clock CLK and execute continuous access.

Figure 3:
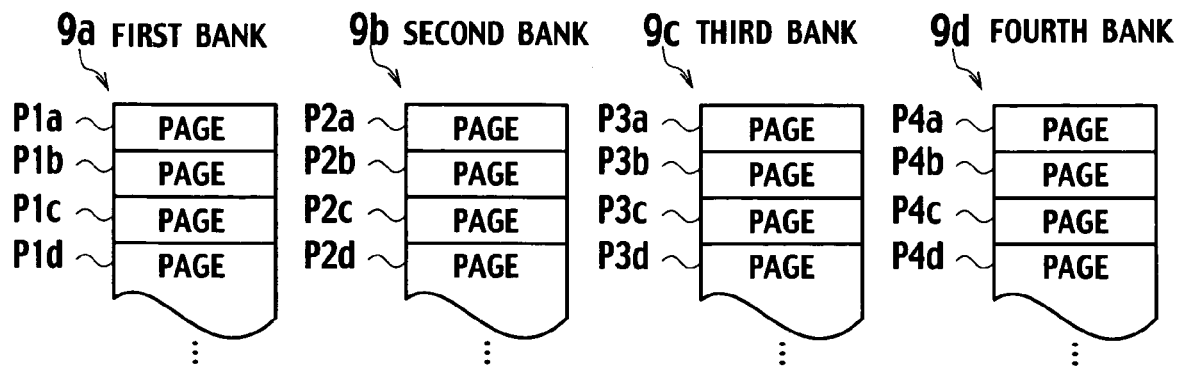
FIG. 3 is a schematic diagram showing an arrangement example of a plurality of pages in each bank of the picture memory according to the embodiment of the present invention.

As shown in FIG. 3, the first bank 9a includes a plurality of pages P1a, P1b, P1c, P1d, . . . , having row addresses distributed in order. In the same manner, the second bank 9b includes a plurality of pages P2a, P2b, P2c, P2d, . . . . The third bank 9c includes a plurality of pages P3a, P3b, P3c, P3d, . . . . And the fourth bank 9d includes a plurality of pages P4a, P4b, P4c, P4d, . . . .

Figure 4:
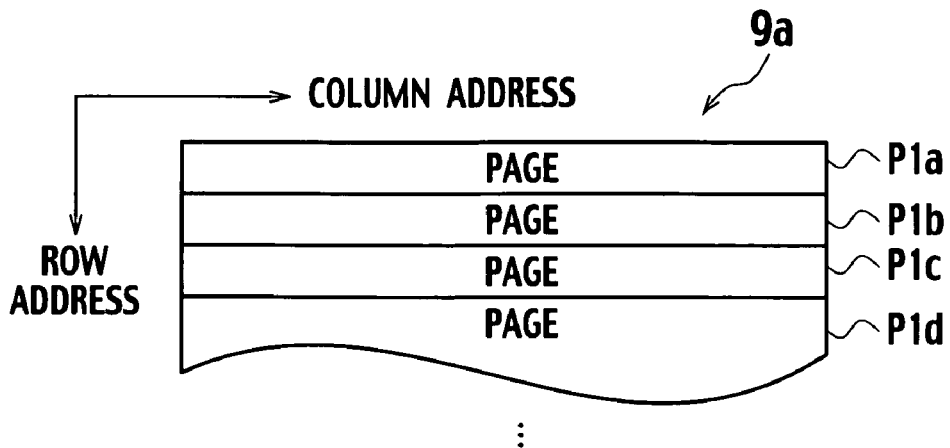
FIG. 4 is a schematic diagram showing a relationship of rows and columns with each page according to the embodiment of the present invention.

As shown in FIG. 4, in the first bank 9a, it is possible to access an arbitrary address of the plurality of pages P1a, P1b, P1c, P1d, . . . , according to the row and column address. Each page has a storage capacity of 2048 bytes for example.

Figure 5:
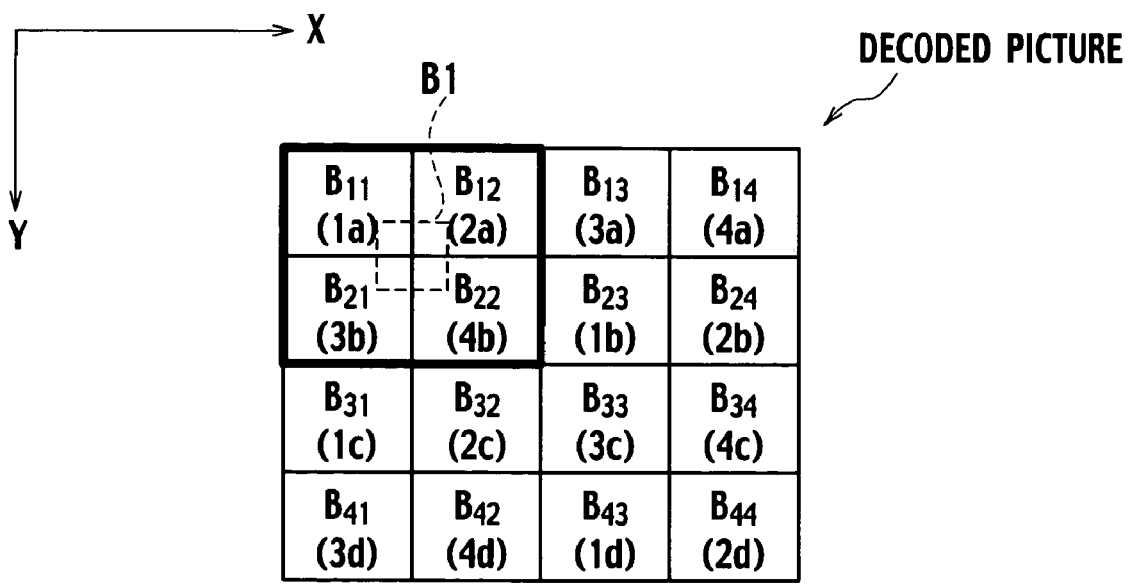
FIG. 5 is a schematic diagram for the purpose of describing operation of a write controller according to the embodiment of the present invention.

As shown in FIG. 5, the decoded picture that the write controller 5 shown in FIG. 1 writes to the picture memory 9 has for example a vertical address Y and a horizontal address X of a number of bits corresponding to the number of horizontal and vertical pixels in the picture as the picture address. For instance, when the decoded picture shown in FIG. 5 is divided into a plurality of blocks $B_{11}$ to $B_{44}$, the picture data of the picture blocks $B_{11}$, $B_{12}$, $B_{13}$, and $B_{14}$ are each respectively stored in the page P1a of the first bank 9a, the page P2a of the second bank 9b, the page P3a of the third bank 9c, and the page P4a of the fourth bank 9d shown in FIG. 3.

Similarly, the picture data of the picture blocks $B_{21}$, $B_{22}$, $B_{23}$, and $B_{24}$ are each respectively stored in the page P1b of the first bank 9a, the page P2b of the second bank 9b, the page P3b of the third bank 9c, and the page P4b of the fourth bank 9d shown in FIG. 3. The picture data of the picture blocks $B_{31}$, $B_{32}$, $B_{33}$, and $B_{34}$ are each respectively stored in the page P1c of the first bank 9a, the page P2c of the second bank 9b, the page P3c of the third bank 9c, and the page P4c of the fourth bank 9d. The picture data of the picture blocks $B_{41}$, $B_{42}$, $B_{43}$, and B$_{44}$ are each respectively stored in the page P1d of the first bank 9a, the page P2d of the second bank 9b, the page P3d of the third bank 9c, and the page P4d of the fourth bank 9d.

Figure 6A:
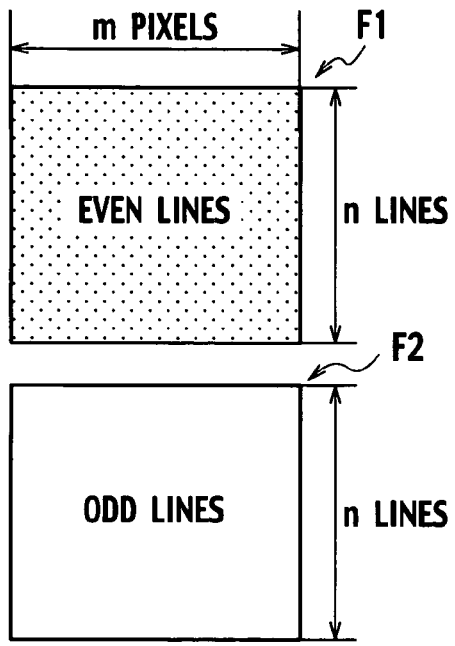
FIG. 6A is a schematic diagram showing a field structure decoded picture stored in the picture memory according to the embodiment of the present invention.

When the decoded picture written to the picture memory 9 has the field structure, the decoded picture is separated into a top field F1 comprised of pixels occupying the even lines and a bottom field F2 comprised of pixels occupying the odd lines, as shown in FIG. 6A. Each field has m×n number of pixels, that is, m number of pixels in the horizontal direction and n lines in the vertical direction (m, n; an integer 2 or greater). When the decoded picture has the frame structure, when the field structure is used as the standard, the frame has m×2n number of pixels, that is, m pixels in the horizontal direction, and 2n lines in the vertical direction.

The write controller 5 shown in FIG. 1 correlates the horizontal and vertical address X and Y of the decoded picture shown in FIG. 5 with the row and column address of the picture memory 9 and executes writing. As a result, due to the position on the picture being in accordance with the position in the memory, it is possible for the read controller 7 to control the row address data AD1 and the column address data AD2 according to the horizontal and vertical position on the picture and read from the picture memory 9.

Figure 6B:
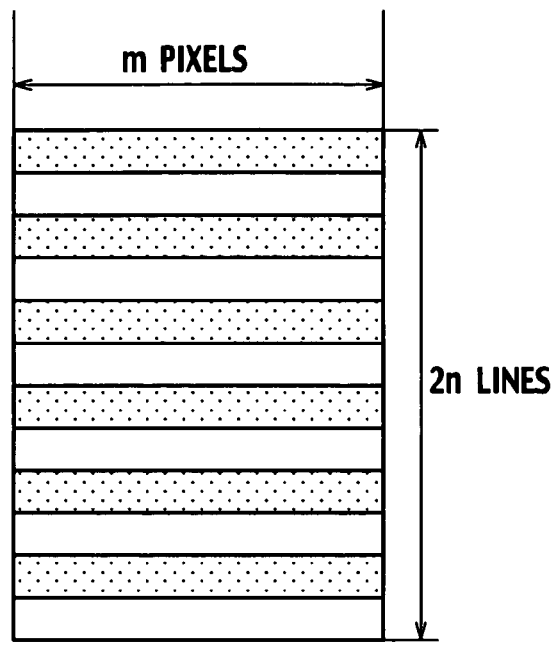
FIG. 6B is a schematic diagram showing a frame structure decoded picture stored in the picture memory according to the embodiment of the present invention.
Figure 7:
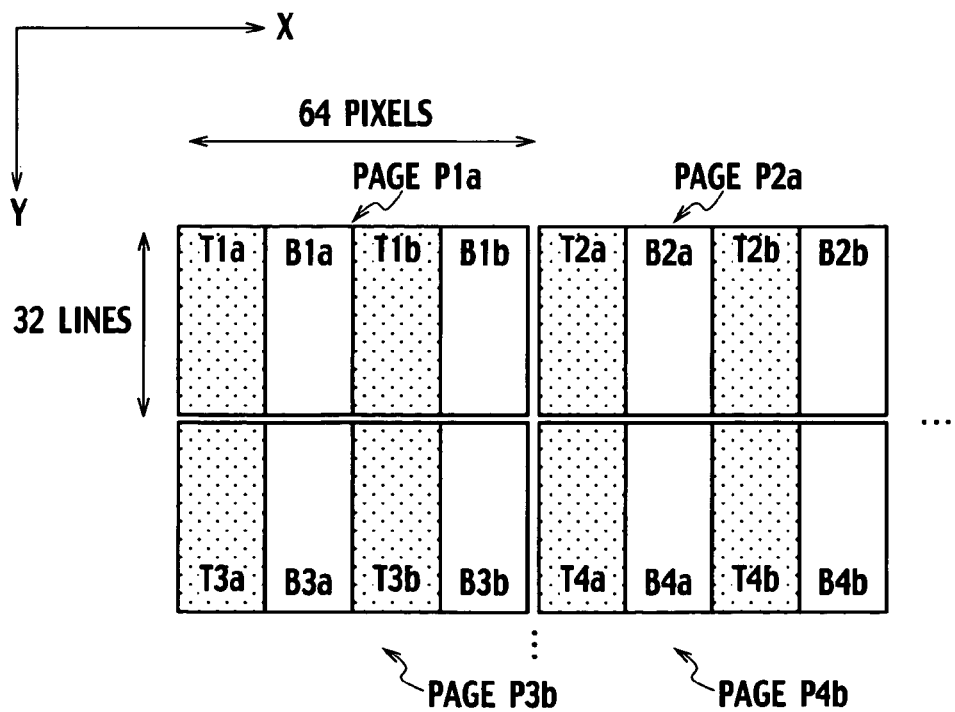
FIG. 7 is a schematic diagram showing an example of writing of picture data of the decoded picture corresponding to each page of the picture memory according to the write controller according to the embodiment of the present invention.

In a format in the manner shown in FIG. 7, the write controller 5 and the read controller 7 correlate the picture address with the memory address. As shown in FIG. 6A and 6B, when each field structured decoded picture is m×n pixels, and the frame structured decoded picture is m×2n, it is possible to contemplate the picture memory 9 as virtually being a virtual two-dimensional memory region having a width of 2 m pixels and a height of 1.5 n lines. Here, the term "virtual two-dimensional memory region" refers to a virtual memory region having pages divided by a constant column address, and having the divided pages aligned therein, and having the column address direction established in the horizontal direction, and having the direction in which the divided pages are aligned established in the vertical direction.

When it is assumed that different constituent (chrorinance, when the constituent is luminance; luminance when the constituent is chrominance) is omitted, the two pixels are disposed in a manner continuous in the virtual two-dimensional memory region as well. The picture data of the pixels occupying the even and odd lines of the decoded picture is aligned in the horizontal direction of the virtual two-dimensional memory region in a manner alternating at every constant number of pixels.

In the example shown in FIG. 7, storage regions T1a and T1b for picture data of pixels occupying the even lines, and storage regions B1a and B1b for picture data of pixels occupying the odd lines, are set corresponding to the page P1a. In a similar fashion, storage regions T2a and T2b for picture data of pixels occupying the even lines, and storage regions B2a and B2b for picture data of pixels occupying the odd lines, are set corresponding to the page P2a. Storage regions T3a and T3b for picture data of pixels occupying the even lines, and storage regions B3a and B3b for picture data of pixels occupying the odd lines, are set corresponding to the page P3a. Storage regions T4a and T4b for picture data of pixels occupying the even lines, and storage regions B4a and B4b for picture data of pixels occupying the odd lines, are set corresponding to the page P4a.

Figure 8:
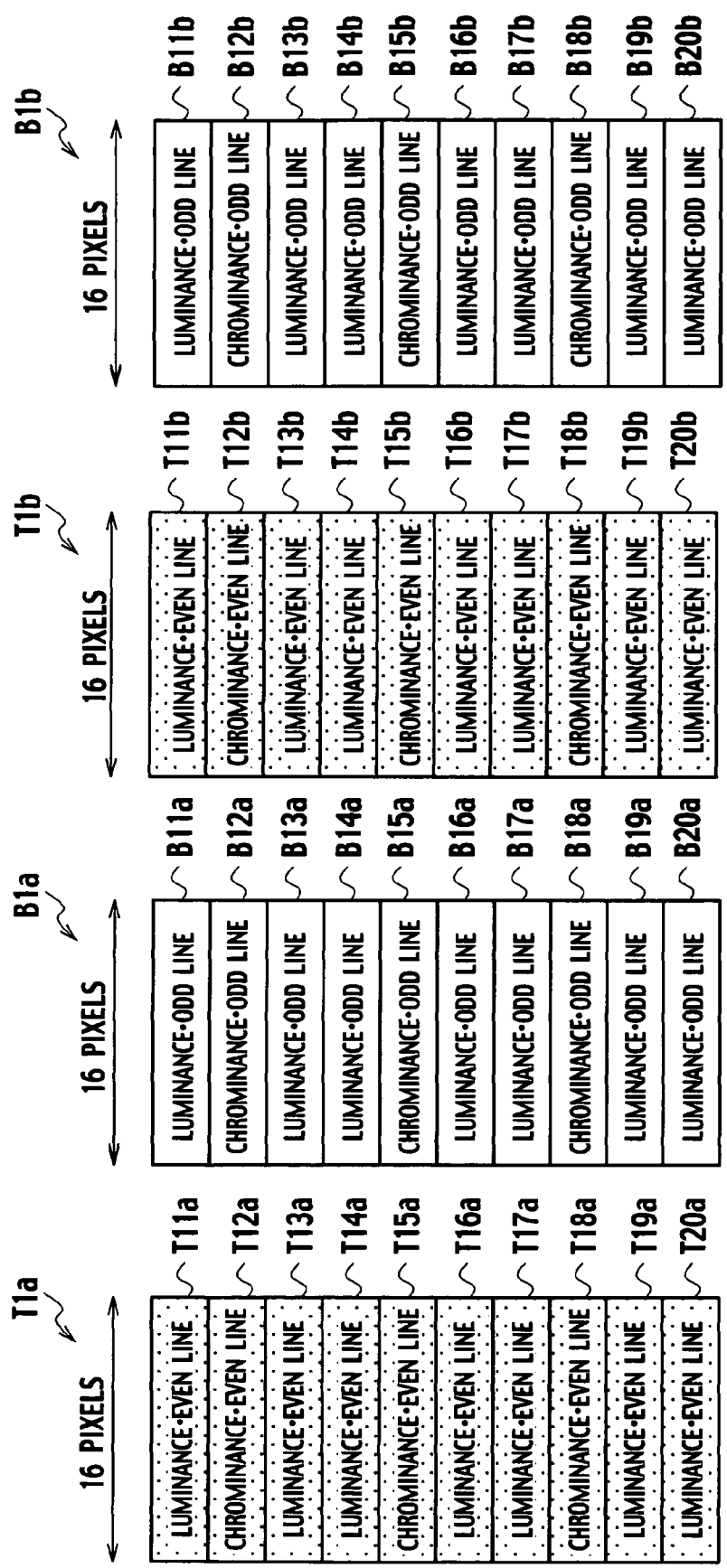
FIG. 8 is a schematic diagram showing an example of storing the picture data of the decoded picture in each page by the write controller according to the embodiment of the present invention.

In the decoded picture data continuing in the vertical direction of the virtual two-dimensional memory region, the luminance component and the chrominance component are blended at a constant ratio. For instance, as shown in FIG. 8, the luminance component and the chrominance component are blended at a ratio of 2:1 in the vertical direction of the virtual two-dimensional memory region. Here, the ratio of the luminance component and the chrominance component differ according to the format of the picture data. Normally, roughly 1 byte of information is distributed to each the luminance component Y, the blue chrominance component Cb, and the red chrominance component Cr for 1 pixel. However, because the human eye is not sensitive to color, the technique of cutting down and reducing the color information is widely used. 4:2:2 or 4:2:0 are formats for reducing color information. In the case of the 4:2:2 format, the blue chrominance component Cb and the red chrominance component Cr are ½ of the luminance component, and in the case of the 4:2:0 format, the blue chrominance component Cb and the red chrominance component Cr are ½ of the luminance component. An example of using the 4:2:0 format is shown in FIG. 8.

In the example shown in FIG. 8, a luminance component (even line) T11a, a chrominance component (even line) T12a, a luminance component (even line) T13a, a luminance component (even line) T14a, a chrominance component (even line) T15a, a luminance component (even line) T16a, a luminance component (even line) T17a, . . . , are disposed in the vertical direction in the picture data storage region T1a for the pixels occupying the even lines in the page P1a. Similarly, the luminance component and the chrominance component are disposed in the vertical direction in the picture data storage region T1b for the pixels occupying the even lines and the picture data storage regions B1a and B1b for the pixels occupying the odd lines.

Figure 9:
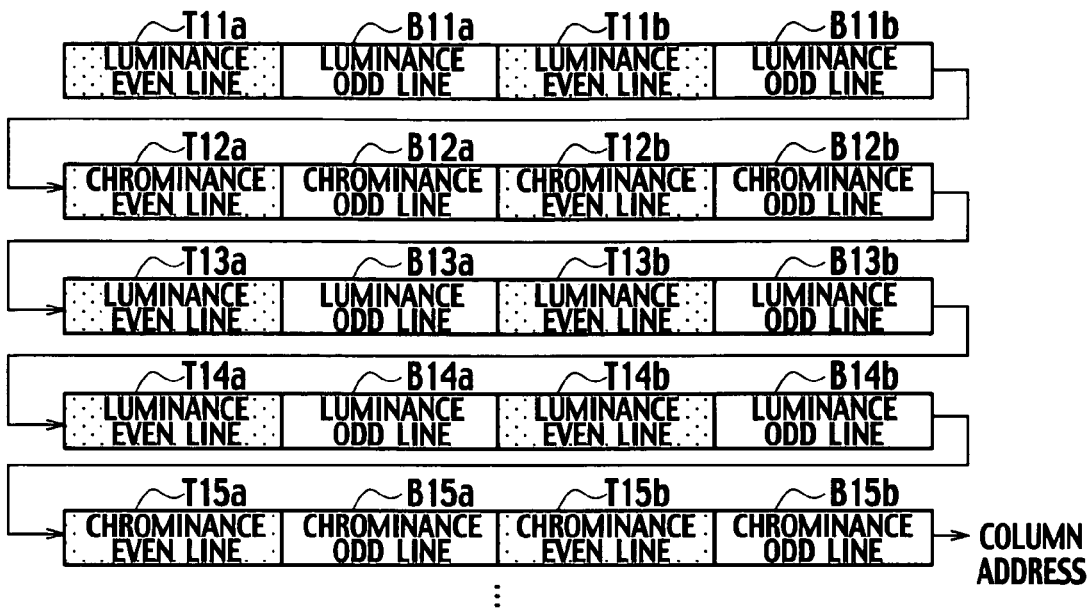
FIG. 9 is a schematic diagram showing a relationship of the picture data of the decoded picture in each page with the column address.

When each of the luminance components and each of the chrominance components shown in FIG. 8 are converted into the column address, they are aligned in the manner of the luminance component (even line) T11a, the luminance component (odd line) B11a, the luminance component (even line) T11b, the luminance component (odd line) B11b, the chrominance component (even line) T12a, the chrominance component (odd line) B12a, the chrominance component (even line) T12b, the chrominance component (odd line) B12b, . . . , as shown in FIG. 9. That is, the pixel data of the pixels occupying the even lines and the pixel data of the pixels occupying the odd lines come to be written alternately in the row address direction of each page. The luminance components and the chrominance components are each written selectively in the column address direction of each page in accordance with the format.

Next, the description will be given in regard to the operation of writing the picture data of the decoded picture to the picture memory 9 in the picture processing apparatus according to the embodiment of the present invention.

(A) The encoded data IN is decoded in units of picture blocks by the variable length decoder 1, the inverse quantizer 2, the IDCT circuit 3, the adder 4, and the like, shown in FIG. 1. The decoded picture data is then supplied, in units of the picture blocks, to the memory controller 8.

(B) As shown in FIG. 5, the bank selector 11 divides the decoded picture into a plurality of blocks, and generates the bank selection signal BSEL for selecting the page of a different page as a write destination of a block adjacent in at least one of either the horizontal direction or the vertical direction. As shown in FIG. 5, bank switching is carried out when page switching is carried out.

(C) As shown in FIG. 7, the write controller 5 generates a memory address to the memory controller 8 to be used for writing.

(D) Controlled by the write controller 5, the memory controller 8 writes the decoded picture data from the adder 4 to the picture memory 9. As a result, as shown in FIG. 9, the even lines and the odd lines are written in the column address direction of each page in a manner alternating by a constant number of pixels of the decoded picture. Further, the luminance component and the chrominance component are written in a cyclic manner in the row direction of each page.

Next, description will be given in regard to the operation of reading the region of a portion of the decoded picture, or more simply, reading the reference picture, from the picture memory 9 in the picture processing apparatus according to the embodiment of the present invention.

(A) The motion compensator 6 shown in FIG. 1 calculates the position on the decoded picture of the block corresponding to the decoding target picture block, based on the motion vector data MV from the variable length decoder 1. When the block B1 shown in FIG. 5 corresponds to the decoding target picture block, the motion compensator 6 reads the picture address corresponding to the picture block B1 and supplies it to the read controller 7.

Figure 10:
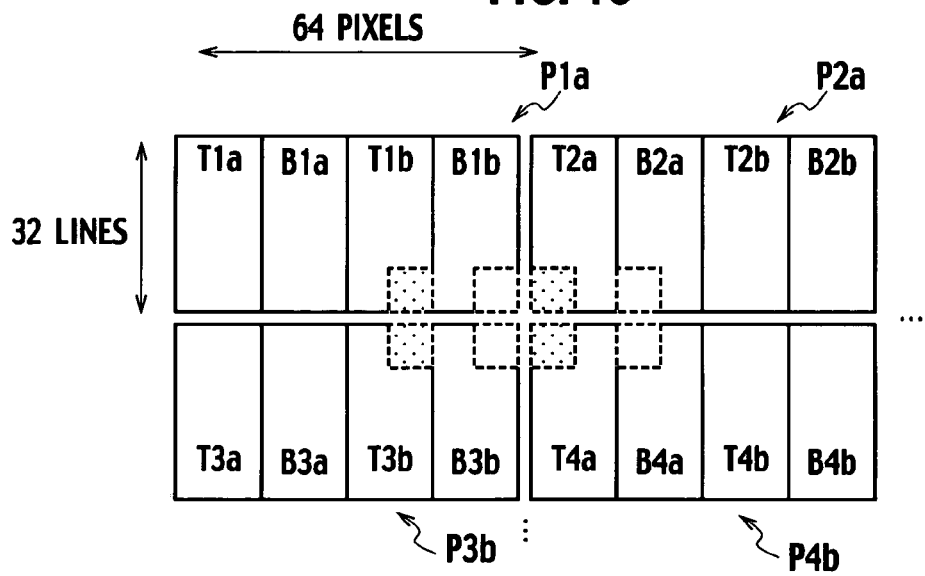
FIG. 10 is a schematic diagram for the purpose of describing operation when a read controller reads out a portion of the picture data of the decoded picture.

(B) When the picture address corresponding to the picture block B1 corresponds to the region on the virtual two-dimensional memory region indicated by the broken line of FIG. 10, the read controller 7 converts the picture address to the memory address and supplies it to the memory controller 8.

(C) As a result, the memory controller 8 reads the decoded picture block B1 from the picture memory 9 as the reference picture, based on the memory address intended for use in reading. The reference picture that has been read out is supplied to the adder 4 via the motion compensator 6. And in a manner similar to that of during writing, bank switching is carried out when page switching is carried out.

According to carrying out bank switching when page switching is carried out in either of the reading or writing operations, it is possible to reduce the overhead cycles to lower than in a case of switching is carried out without carrying out bank switching. As shown in FIG. 10, it is effective to position a read target reference block on the borders of a plurality of pages when it is necessary to carry out page switching numerous times. Herein below detailed description will be given in regard to the reason the overhead cycles can be reduced.

Figure 11:
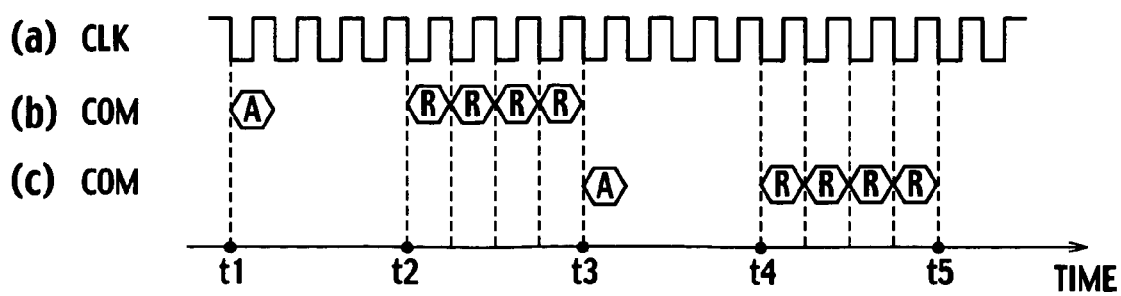
FIG. 11 is a time chart showing the read out operation by the read controller according to the embodiment of the present invention.

First, description will be given in regard to the read operation when switching is carried out on the occasion of page switching, using the time chart shown in FIG. 11 as a reference. FIG. 11(*b*) is the command COM corresponding to the first bank 9*a* shown in FIG. 2, while FIG. 11(*c*) is the command COM corresponding to the second bank 9*b*. At a time tl of the FIG. 11(*b*), an active command "A" is supplied to the first bank 9*a*. The bank selection signal BSEL, the row address data AD1, and the like are input at the same time as the input of the active command "A".

After a constant amount of time has passed following the supply of the active command "A", a read command "R" is continuously supplied synchronous to the clock CLK shown in FIG. 11(*a*) during a period of time spanning from time instants t2 to t3. The column address data AD2 is input at the same time as the input of the read command R.

Further, at a time instant t3 of the FIG. 11(*c*), the active command "A" is supplied to the second bank 9*b*. After a constant amount of time has passed following the supply of the active command "A", the read command "R" is continuously supplied synchronous to the clock CLK shown in FIG. 11(*a*) during a period of time spanning from time instants t4 to t5.

From the input of the active command "A" until it becomes possible to input the read command "R", a delay time period corresponding to row address strobe (RAS)-column address strobe (CAS) latency (tRCD) is generated, as shown in FIG. 12. In the example shown in FIG. 12, the tRCD is 15 ns. FIG. 12(*a*) is the command COM corresponding to the first bank 9*a* and FIG. 12(*b*) is the command COM corresponding to the second bank 9*b*. The overhead cycle from the input of the active command "A" shown in FIG. 12(*a*) until the read command "R" is input is a 2 cycle overhead cycle, as shown in FIG. 12(*d*). When the clock (clock cycle) shown in FIG. 12(*c*) is 166 MHz, a 3 cycle overhead cycle is generated in the bank switching carried out in step with the page switching, as shown in FIG. 12(*d*).

As an example, when the motion compensator 6 outputs a frame structured reference picture, and the regions of portions of the decoded picture to become the read target are positioned on the borders of 4 banks is assumed. A result of an estimated number of clock cycles required for the completion of the reading of the regions of the luminance component 9×9 pixels and the chrominance component 3×3 pixels, which are the minimum range in the H.264 standard, is shown in FIG. 13 as a range of the decoded picture reference block. Also, a result of an estimated number of clock cycles required for the completion of the reading of the regions of the luminance component 21×21 pixels and the chrominance component 9×9 pixels, which are the minimum range in the H.264 standard, is shown in FIG. 14.

Figure 15:
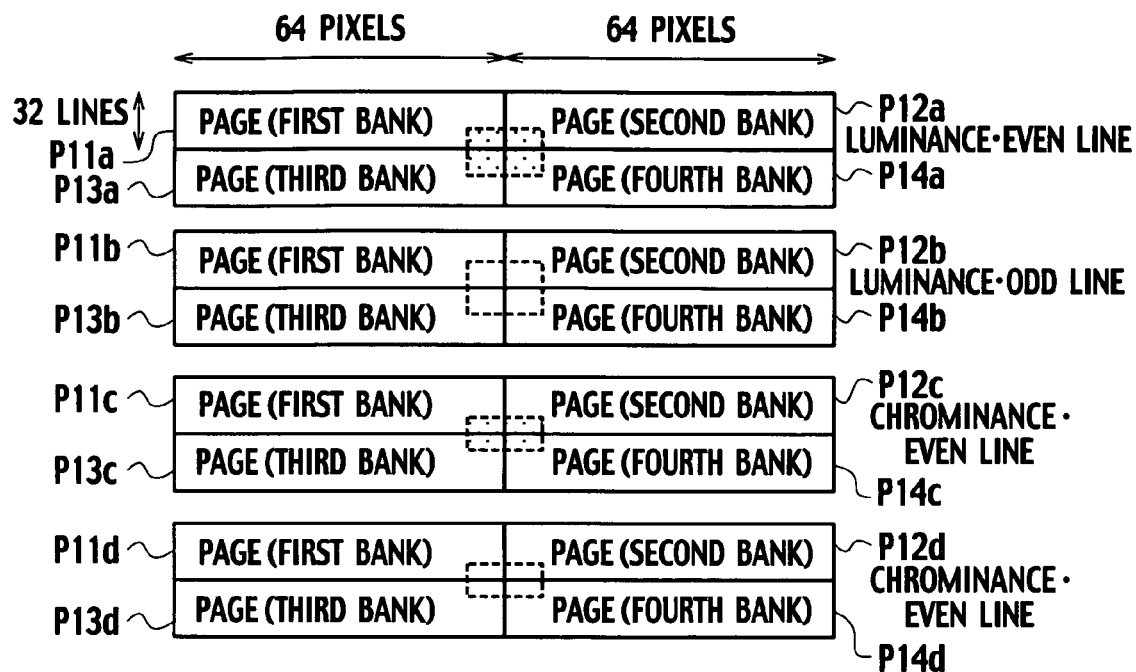
FIG. 15 is a schematic diagram for the purpose of describing the operation of a read controller according to a comparative example of the embodiment of the present invention.

Next, as shown in FIG. 15 as a comparative example, a case in which the luminance component of the pixels occupying the even lines of the decoded picture, the chrominance component of the pixels occupying the even lines of the decoded picture, the luminance component of the pixels occupying the odd lines of the decoded picture, and the chrominance component of the pixels occupying the odd lines of the decoded picture are each stored in different pages is assumed. In this case, in reading the entire region surrounded by the broken line of FIG. 15, page switching occurs within a single bank. When page switching occurs within a single bank, the overhead cycles increase.

Figure 16:
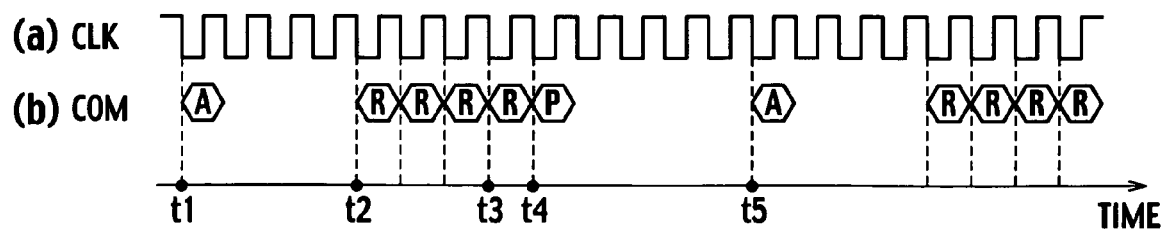
FIG. 16 is a time chart showing the read out operation according to a comparative example of the embodiment of the present invention.

As an example, the FIG. 16(*b*) is the command COM corresponding to the first bank 9*a* shown in FIG. 2. At the time ti of FIG. 16(*b*), the active command "A" is supplied to the first bank 9*a*. After a constant amount of time has passed following the supply of the active command "A", a read command "R" is continuously supplied synchronous to the clock CLK shown in FIG. 16(*a*) during a period of time spanning from time instants t2 to t3. And at the time instant t4 of FIG. 16(*b*) a pre-charge command "P" is supplied to the first bank 9*a*, and at the time instant t5 the active command "A" is supplied.

When page switching is carried out within a single bank, a delay time period called a RAS pre-charge time period (tRP) is generated from the time of the input of the pre-charge command "P" until the time at which input of the active command "A" becomes possible, as shown in FIG. 17. In the example shown in FIG. 17, during the page switching within the single bank, a total 6 cycle overhead cycle is generated. A result of an estimated number of clock cycles of under the same conditions of FIG. 13 is shown in FIG. 18, when the format shown in FIG. 15 is used. A result of an estimated number of clock cycles of under the same conditions had in FIG. 14 is shown in FIG. 19, when the format shown in FIG. 15 is used.

As shown in FIGS. 13, 14, 18 and 19, in the comparative example, roughly 1.6 to 3.5 times the number transfer cycles are required when compared to the embodiment of the present invention. Thus, by picture processing apparatus according to the embodiment of the present invention, it is possible to realize optimized memory access of the decoded picture in the decoding of the encoded data IN, by carrying out bank switching when carrying out page switching, and by storing the luminance component and the chrominance component within the same page, in either of the write or read operations. Because of this, it is possible to cut the overhead cycles and realize high speed memory access.

(First Modification)

Figure 20:
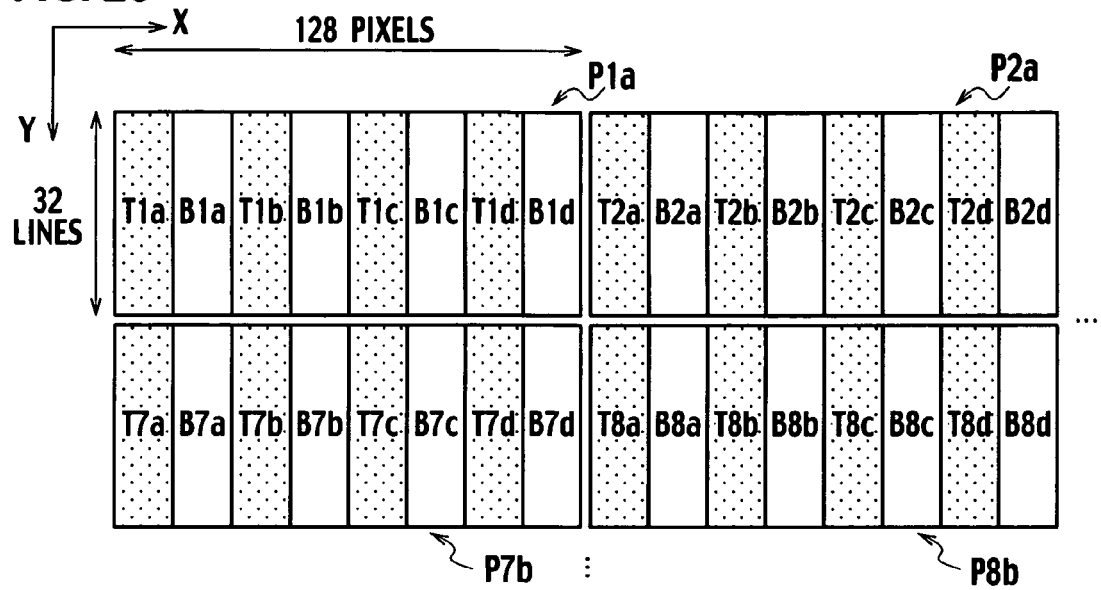
FIG. 20 is a schematic diagram showing an example of writing the picture data of the decoded picture corresponding to each page of the picture memory according to a first modification of the embodiment of the present invention.

It is acceptable to establish the picture memory 9 with a count of 8 banks as the picture processing apparatus according to the first modification of the embodiment of the present invention. Further, it is acceptable for each page to have a memory capacity of 4096 bytes as shown in FIG. 20. As a result, the number of pixels in the horizontal direction of each page is 128, and 4 of the storage regions of the picture data of the pixels occupying the even and odd lines are disposed in the horizontal direction, in the virtual two-dimensional memory region. Other arrangements are similar to those of FIG. 7 and FIG. 8. According to the first modification of the embodiment of the present invention, it is possible to use the picture memory 9 having an 8 bank structure wherein the memory capacity of each page is 4096 bytes.

(Second Modification)

Figure 21:
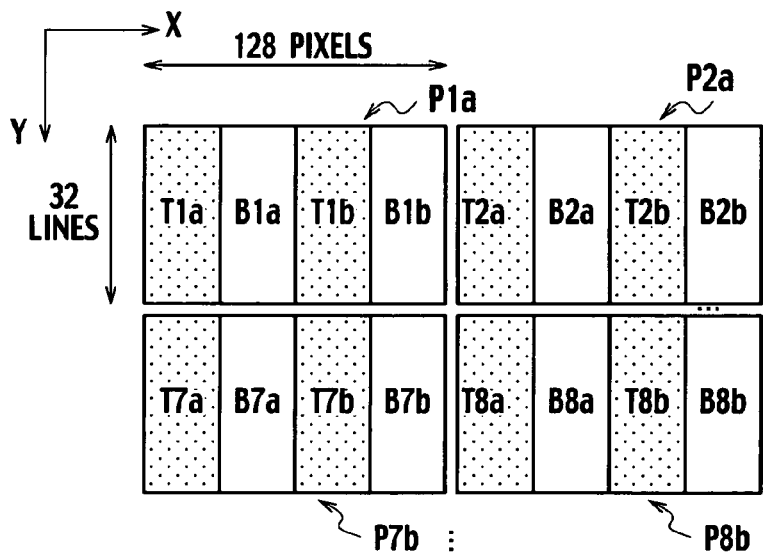
FIG. 21 is a schematic diagram showing an example of writing the picture data of the decoded picture corresponding to each page of the picture memory according to a second modification of the embodiment of the present invention.
Figure 22:
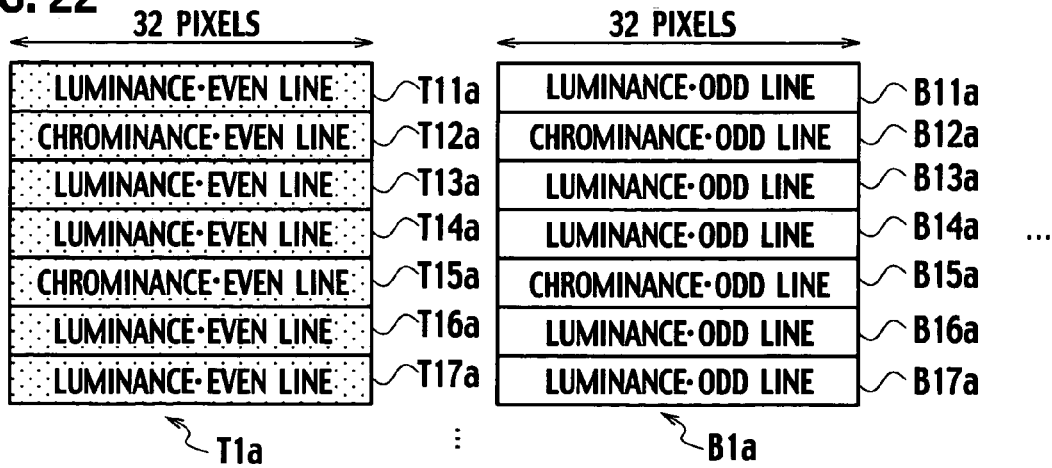
FIG. 22 is a schematic diagram showing an example of storing the picture data of the decoded picture in each page according orthogonal table the write controller according to the second modification of the embodiment of the present invention.

It is acceptable to establish the picture memory 9 with a count of 8 banks as the picture processing apparatus according to the second modification of the embodiment of the present invention. Further, it is acceptable for each page to have a data storage capacity of 4096 bytes, as shown in FIG. 21. However, the point of the picture data of the pixels occupying the even and odd lines of the decoded picture being each aligned in the horizontal direction of the virtual two-dimensional memory region in a manner alternating every 32 pixels is different from the FIG. 8.

Other Embodiments

Various modifications will become possible for those skilled in the art after receiving the teachings of the present disclosure without departing from the scope thereof.

In the above description of the embodiment, although description has been given using the picture decoder as the picture processing apparatus as the example, it is also acceptable to apply this to picture encoders as well. This is because processing of the same manner as in the decoder may be carried out in an encoder including the picture memory 9 as well.

In the picture processing apparatus shown in FIG. 1, although illustration has been conducted in a manner only showing the very minimum constitutions necessary for sufficient description, it is also acceptable to add or change constitutions of the picture processing apparatus shown in FIG. 1 as needed to correspond to various compression encoding standards such as H.263, H.264, MPEG-1, MPEG-2, MPEG-4, or the like. Also, although an example using the picture memory 9 having a 4 bank or 8 bank constitution has been described, it is also acceptable to use a picture memory 9 having 2 banks or the like.

The decoder 10, the picture memory 9, the bank selector 11, the write controller 5, the motion compensator 6, and the read controller 7 shown in FIG. 1 may all be integrated atop a single semiconductor chip to constitute a semiconductor integrated circuit. However, it is also acceptable to constitute the picture memory 9 on a separate (external) chip.

What is claimed is:

1. A picture processing apparatus comprising:
a decoder configured to decode encoded data to generate a decoded picture;
a picture memory having a plurality of banks each containing a plurality of pages to which row addresses are assigned, and configured to store the decoded picture;
a bank selector configured to divide the decoded picture into a plurality of macro blocks, and to select a page of a different bank as a write location for a macro block adjacent in at least one of either a horizontal direction or a vertical direction;
a write controller configured to write pixel data of pixels occupying predetermined lines of a first macro block corresponding to top fields, and pixel data of pixels occupying predetermined lines of a second macro block corresponding to bottom fields in a column address direction of each of the page in an alternating manner if the decoded picture is a field structure, and configured to write, for each macro block, pixel data of pixels occupying lines corresponding to top fields, and pixel data of pixels occupying lines corresponding to bottom fields in a column address direction of each of the page in an alternating manner if the decoded picture is a frame structure; and
a read controller configured to read the decoded picture from any page of the plurality of banks, and to carry out switching to a page of another bank in a case in which switching of a read target page occurs, by a similar manner for both structures of the field structure and the frame structure.

2. The picture processing apparatus of claim 1, wherein the write controller writes each of a luminance component and a chrominance component contained in the pixel data in a column address direction of each of the page in a selective manner.

3. The picture processing apparatus of claim 1, further comprising:
a motion compensator configured to designate a region of a portion of the decoded picture, and to output a region of a portion of the decoded picture read by to the read controller as a reference picture, in accordance with motion vector data decoded by the decoder from the encoded data.

4. The picture processing apparatus of claim 1, wherein the write controller correlates a picture address of the decoded picture with the row and column addresses, and controls writing of the pixel data; and the read controller correlates the picture address with the row and column addresses, and controls reading of the pixel data.

5. A semiconductor integrated circuit comprising:
a decoder configured to decode encoded data to generate a decoded picture;
a picture memory having a plurality of banks each containing a plurality of pages to which row addresses are assigned, and configured to store the decoded picture;
a bank selector configured to divide the decoded picture into a plurality of macro blocks, and to select a page of a different bank as a write location for a macro block adjacent in at least one of either a horizontal direction or a vertical direction;
a write controller configured to write pixel data of pixels occupying predetermined lines of a first macro block corresponding to top fields, and pixel data of pixels occupying predetermined lines of a second macro block corresponding to bottom fields in a column address direction of each of the page in an alternating manner if the decoded picture is a field structure, and configured to write, for each macro block, pixel data of pixels occupying lines corresponding to top fields, and pixel data of pixels occupying lines corresponding to bottom fields in a column address direction of each of the page in an alternating manner if the decoded picture is a frame structure; and a read controller configured to read the decoded picture from any page of the plurality of banks, and to carry out switching to a page of another bank in a case in which switching of a read target page occurs, by a similar manner for both structures of the field structure and the frame structure.

6. The semiconductor integrated circuit of claim 5, wherein the write controller writes each of a luminance component and a chrominance component contained in the pixel data in a column address direction of each of the page in a selective manner.

7. A method for controlling a picture memory having a plurality of banks each containing a plurality of pages to which row addresses are assigned, the method comprising:

dividing a decoded picture into a plurality of macro blocks;

selecting a page of a different bank as a write location for a macro block adjacent in at least one of either a horizontal direction or a vertical direction;

writing pixel data of pixels occupying predetermined lines of a first macro block corresponding to top fields, and pixel data of pixels occupying predetermined lines of a second macro block corresponding to bottom fields in a column address direction of each of the page in an alternating manner if the decoded picture is a field structure;

writing, for each macro block, pixel data of pixels occupying lines corresponding to top fields, and pixel data of pixels occupying lines corresponding to bottom fields in a column address direction of each of the page in an alternating manner if the decoded picture is a frame structure; and carrying out switching to a page of another bank in a case in which switching of a read target page occurs, while reading the decoded picture from any page of the plurality of banks, by a similar manner for both structures of the field structure and the frame structure.

8. The method of claim 7, further comprising:

writing each of a luminance component and a chrominance component contained in the pixel data in a column address direction of each of the page in a selective manner.

9. The method of claim 7, further comprising:

controlling writing of the pixel data by correlating a picture address of the decoded picture with the row and column addresses; and controlling reading of the pixel data by correlating the picture address with the row and column addresses.

* * * * *